United States Patent [19]

Stewart et al.

[11] Patent Number: 5,470,090
[45] Date of Patent: Nov. 28, 1995

[54] PRECISION SUSPENSION FORK FOR BICYLCES

[75] Inventors: Gerald M. Stewart, Camarillo, Calif.; E. Douglas Bradbury, Colorado Springs, Colo.

[73] Assignee: Manitou Mountain Bikes, Inc., Colorado Springs, Colo.

[21] Appl. No.: 116,683

[22] Filed: Sep. 7, 1993

[51] Int. Cl.$^6$ .................................................. B62K 25/08
[52] U.S. Cl. ............................................................ 280/276
[58] Field of Search ..................................... 280/276, 275, 280/277, 283, 286, 288, 284; 188/268

[56] References Cited

U.S. PATENT DOCUMENTS

| | | | |
|---|---|---|---|
| 2,477,748 | 8/1949 | Hutshins | 280/277 |
| 2,683,034 | 7/1954 | Seddon | 267/63 |
| 2,683,044 | 7/1954 | Seddon et al. | 280/276 |
| 2,708,112 | 5/1955 | Seddon et al. | 280/276 |
| 3,083,038 | 3/1963 | Moulton | 280/276 |
| 4,421,337 | 12/1983 | Pratt | 280/277 |
| 4,561,669 | 12/1985 | Simons | 280/276 |
| 4,971,344 | 11/1990 | Turner | 280/276 |
| 5,060,961 | 10/1991 | Bontrager | 280/279 |
| 5,088,705 | 2/1992 | Tsai | 267/226 |
| 5,098,120 | 3/1992 | Hayashi et al. | 280/276 |
| 5,186,481 | 2/1993 | Turner | 280/276 |
| 5,193,382 | 3/1993 | Wilson et al. | 280/276 |
| 5,193,833 | 3/1993 | Reisinger | 280/276 |
| 5,238,259 | 8/1993 | Wilson et al. | 280/276 |
| 5,269,549 | 12/1993 | Wilson et al. | 280/277 |
| 5,284,352 | 2/1994 | Chen | 280/277 |
| 5,301,973 | 4/1994 | Truchinski | 280/276 |
| 5,310,203 | 5/1994 | Chen | 280/275 |

*Primary Examiner*—Margaret A. Focarino
*Assistant Examiner*—Kevin Hurley
*Attorney, Agent, or Firm*—Ross & McIntosh Sheridan

[57] ABSTRACT

The present invention is a precision suspension fork for bicycles. The fork utilizes a telescoping suspension system for each of its fork legs. The telescoping suspension system includes an outer tube, an inner tube slidably engaged with the outer tube, and a compression rod slidably engaged with the inner tube. The compression rod has a compression flange and a spaced apart rebound flange at a first end, and a positive stop clip at a location adjacent to, but spaced apart from an opposite second end. The suspension system also includes a compression elastomer assembly positioned between a first end of the inner tube and the compression flange of the compression rod to provide a compressive damping force when the outer and inner tubes are compressed from a balanced condition, a rebound elastomer assembly positioned between the rebound flange of the compression rod and an opposite second end of the inner tube to provide a rebound damping force when the outer and inner tubes are extended from the balanced condition, and a second stage elastomer assembly positioned between the second end of the inner tube and the positive stop clip to provide a secondary compressive damping force when the inner tube crushes into the outer tube. An adjuster assembly is further provided to fine-tune the preload on the compression elastomers. The present invention also provides a method of quick conversion between standard and long travel configurations by modifying the configurations of the compression and rebound elastomer assemblies correspondingly.

39 Claims, 5 Drawing Sheets

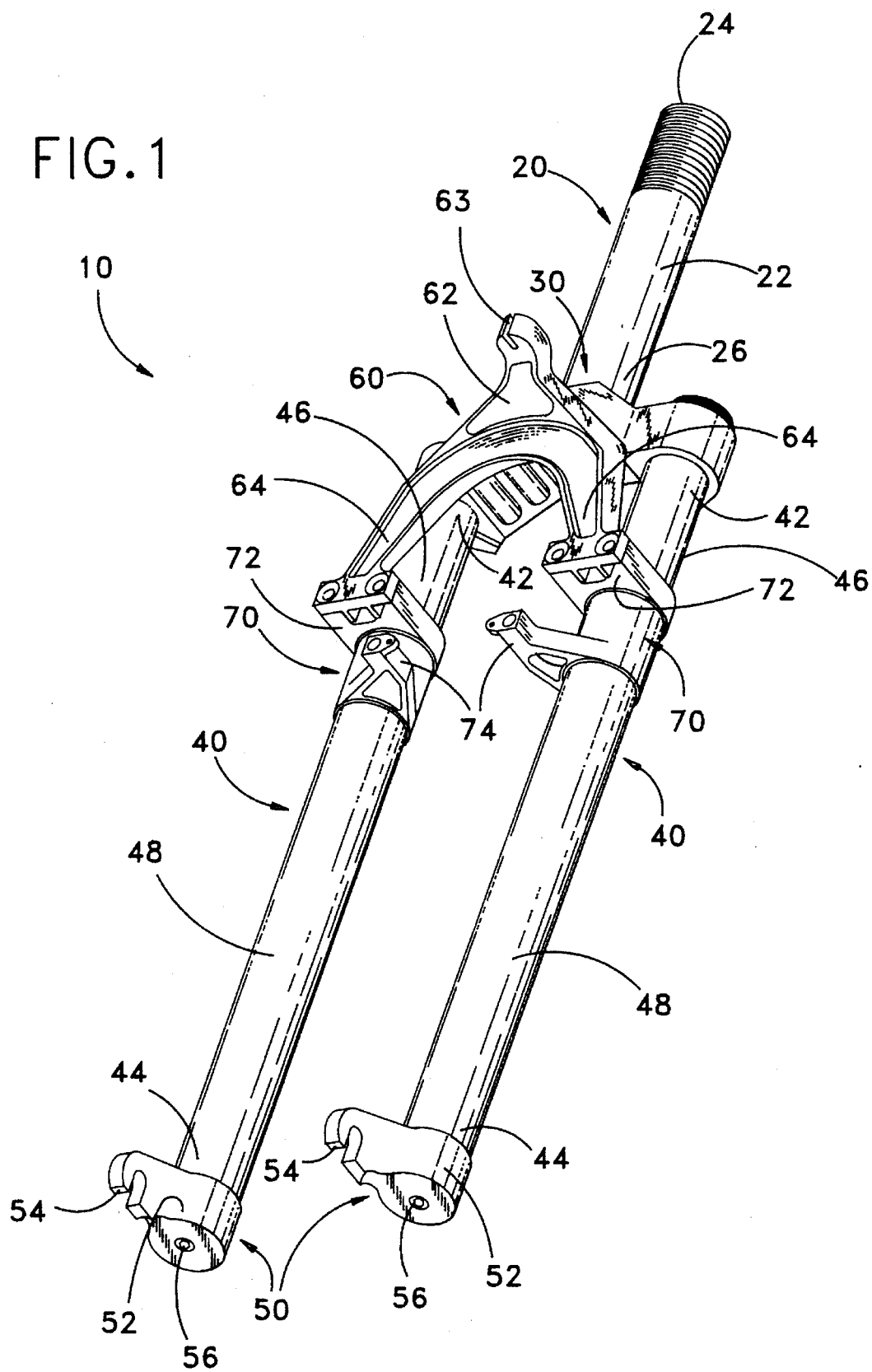

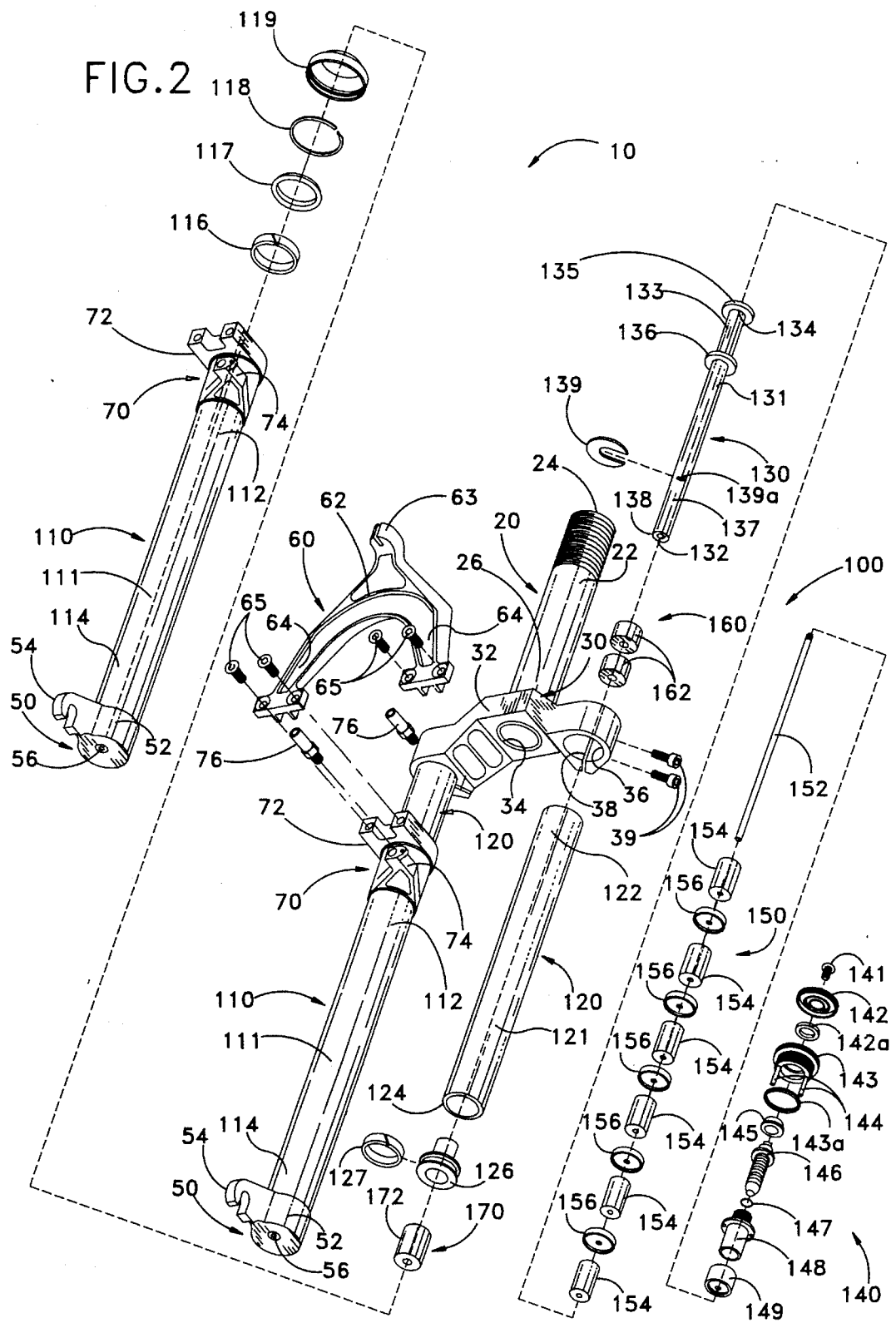

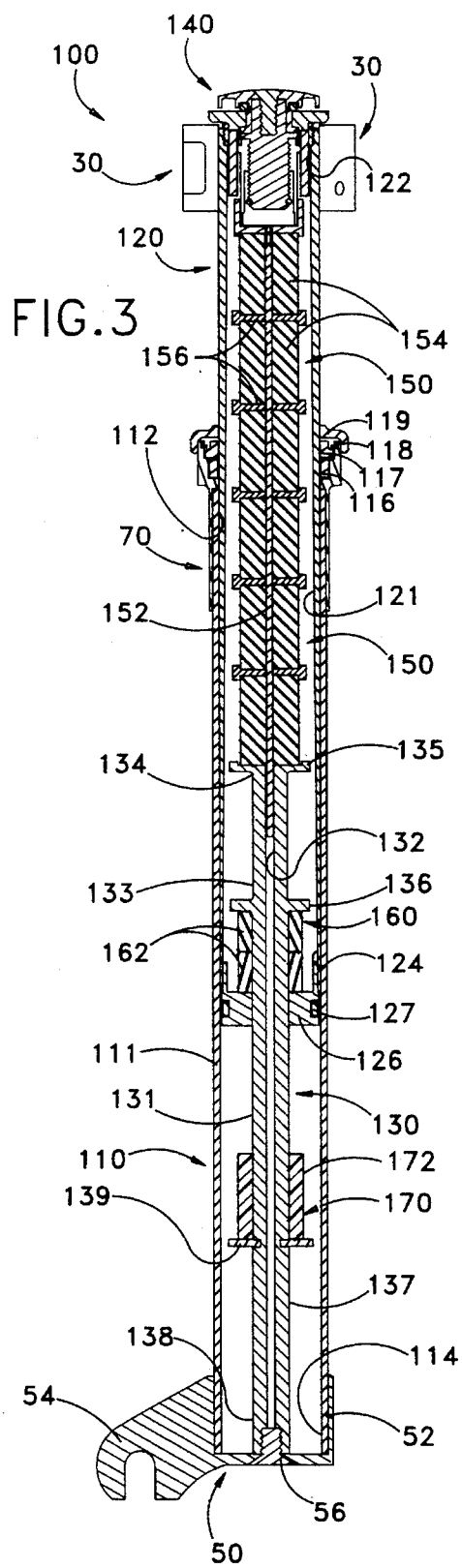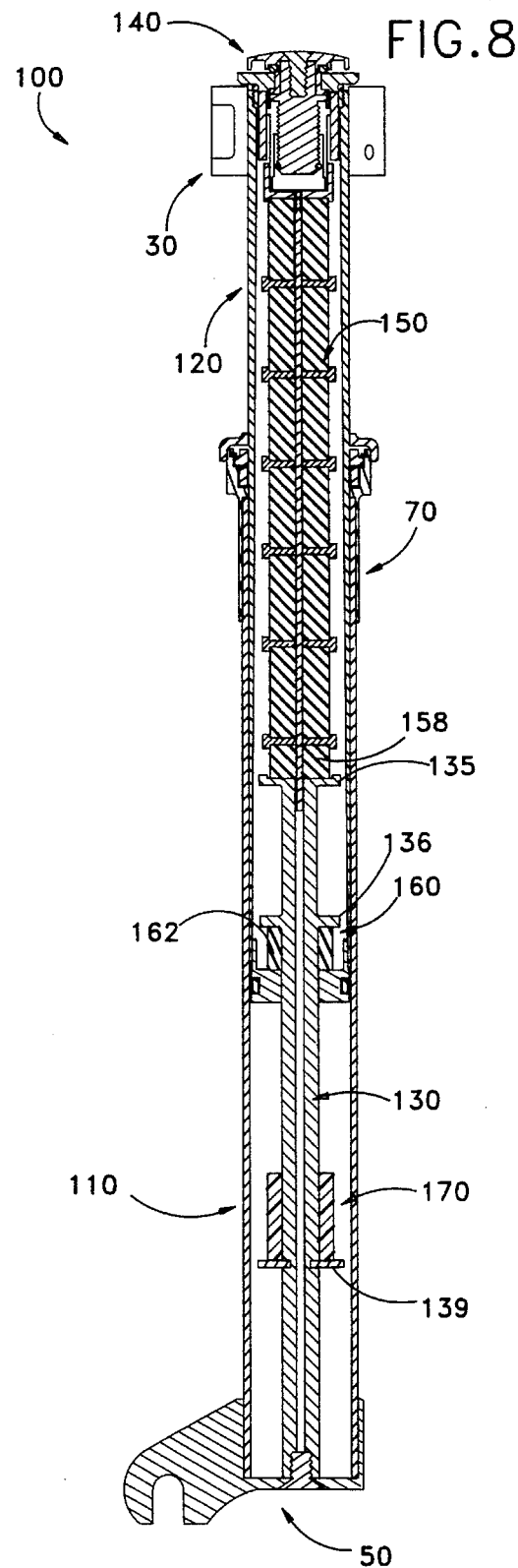

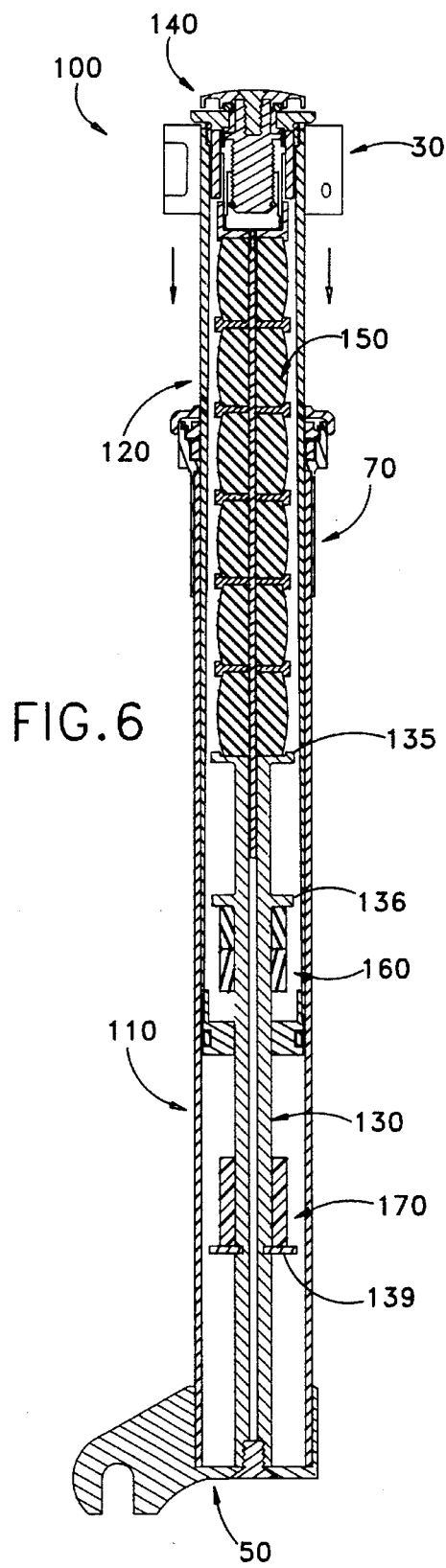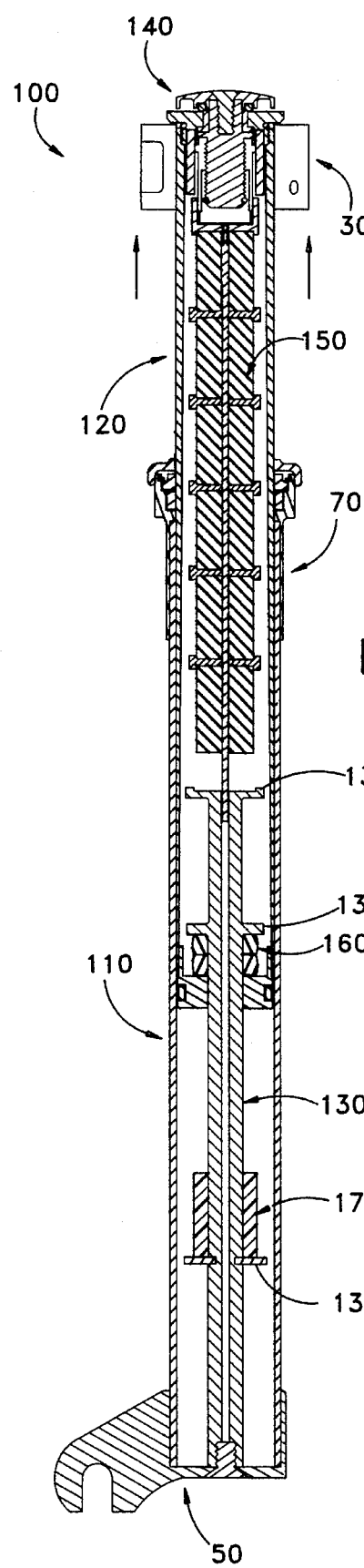

PRECISION SUSPENSION FORK FOR BICYLCES

BACKGROUND OF THE INVENTION

1. Field of the Invention

The present invention relates to the field of design and construction of bicycles. More particularly, the present invention relates to the field of design and construction of the suspension forks for bicycles.

2. Description of the Prior Art

Various suspension forks for bicycles have been introduced in the prior art. The following three (3) patents are found to be pertinent:

U.S. Pat. No. 4,971,344 issued to Turner on Nov. 20, 1990 for "Bicycle with A Front Fork Wheel Suspension" ("the Turner Patent").

U.S. Pat. No. 5,060,961 issued to Bontrager On Oct. 29, 1991 ("the Bontrager Patent").

U.S. Pat. No. 5,193,832 issued to Wilson et al. on Mar. 16, 1993 for "Suspension for Bicycles" ("the Wilson Patent").

The Turner Patent discloses a front fork wheel suspension for a bicycle. The front fork suspension of the Turner Patent provides two improvements to a bicycle front fork having two telescoping suspension assemblies. The first improvement includes a fluid containing circuit for each of the telescoping suspension assemblies, where the fluid containing circuit is designed not to absorb pedal driven energy, but rather to absorb only impact shocks imposed upon the front fork.

There are several disadvantages of this fluid containing design. First, fluid-containing suspension systems generally are not as reliable and durable as no-fluid suspension systems for various reasons, such as the variation of the viscosity of the fluid due to drastic temperature changes, or the leaking of the fluid resulting from the aging of the sealing materials. Second, the Turner Patent fluid-containing bicycle fork has a completely closed assemblement, which means that a rider cannot readily adjust the damping effect of the suspension systems. Third, the complicated structure of the fluid-containing telescoping assemblies makes it very difficult to maintain and repair.

The second improvement of the Turner Patent includes a cross member interconnecting the respective top parts of the two lower tubes of the two telescoping suspension assemblies, where a wheel rim brake is carried by the lower tubes at the location where the cross member connects. This design provides a means for preventing the two legs of the bicycle fork from twisting and rotation, and from moving independently. However, the disadvantage of this design is that it puts all the stresses at the top end of the lower leg, including the bending stress between the upper leg and the lower leg, the twisting stress from the other leg transmitted through the cross member, and the braking force transmitted from the brake post which carries the rim brake.

The Bontrager Patent discloses a bicycle front fork crown assembly. The front fork crown assembly includes a crown, a steerer and two blades. The steerer and the two blades are interconnected by the crown. The crown disclosed by the Bontrager Patent is a unitary piece having a central steerer bore hole and two opposite blade bore holes. All three bore holes are intersected by respective engagement slots. Although the detailed embodiments of the Bontrager Patent are slightly different, they all have the common feature of having the steerer bore hole intersected by an engagement slot.

The disadvantage of having an intersecting slot in the middle of the bicycle crown is that it significantly reduces the strength of the crown. In addition, fastening the steerer to the crown by bolts increases the chance of losing control over the front wheel when the bolts are loosened.

The Wilson Patent discloses a shock absorbing suspension system for a bicycle front fork. The shock absorbing suspension system includes a tube, a strut slidable in the tube, a member connecting both tubes to the handlebars, a biasing member between the tubes and the struts, a rim actuating braking mechanism, and a by-pass connection connecting the braking mechanism to each of the struts. The skewered elastomer bumpers of the Wilson Patent are located inside the top portion of the tubes which are the upper legs of the bicycle front fork. This design makes it possible for a rider to have easy access to the elastomers through the top open end of the tube, so that the rider can replace or exchange the elastomers to adjust the damping effect of the fork, which is very desirable.

In order to achieve this "top-accessible" arrangement, the design of the Wilson Patent has two arrangements. First, the skewered elastomers are placed between the tube and the strut so that the elastomers can resist the strut to slide into the tube and urge the strut to slide out of the tube, thereby providing a damping effect. Second, a by-pass connection is utilized to by-pass the tube and connect the rim brake to the strut, because the rim brake has to be connected to the strut (the lower end of which is fixed to the front wheel axle) to ensure that the distance from the front wheel axle to the rim brake is maintained at a constant distance.

However, each of these two arrangements has its disadvantages. The disadvantage of having the elastomers placed between the tube and the strut is that the elastomers can only damp the strut when it slides into the tube, but provides no damping when the strut slides out of the tube. In other words, the elastomers have no restraint on the strut when it is sliding out of the tube from its balanced position. Therefore, the design of the Wilson Patent provides no rebound damping or rebound control.

In addition, the disadvantage of using a by-pass connection for connecting the rim brake to the strut violates the integrity of the bicycle fork. In one embodiment of the Wilson Patent, the by-pass connection includes a slot on the sidewall of each tube for allowing the braking mechanism to be mounted to the strut therethrough. This embodiment increases the possibility of dust or other dirt entering into the telescoping tube assemblies because there is an open slot on the outer tubes of the fork. In the alternative embodiment of the Wilson Patent, the by-pass connection includes two collars slidably mounted on each tube for attaching the braking mechanism, and connected by a tie rod which in turn is attached to the axle of the front wheel. This embodiment is seriously flawed because when a rider brakes, the collars are likely to be tightly engaged with the tubes because of the brake force and the twisting stress between the legs and the cross brace. However, since the collars are connected to the rigid tie rods which are in turn fixed to the wheel axle, the tight engagement of the collars and the tube will act to prevent the sliding movement between the strut and the tube, thereby seriously reducing the damping effect of the fork.

It is desirable to design and construct a new suspension fork for bicycles which can eliminate the above-mentioned disadvantages in the prior art, while still providing the rider with all the desired features.

SUMMARY OF THE INVENTION

The present invention is a precision suspension fork for bicycles.

The present invention design and construction of the bicycle fork has effectively overcome all the drawbacks of the prior art suspension bicycle forks described in the previous section. Particularly, it is an object of the present invention suspension fork to have a simple structure without utilizing any damping fluid, which makes it much easier to maintain and possible to adjust the damping effect of the fork. It is also an object of the present invention suspension fork to have an arrangement which distributes the various stresses to different locations of the lower legs. It an additional object of the present invention to provide a suspension fork where the steerer is permanently secured to the crown, and the rim brake is attached to the lower legs without any bypass pass connection.

A further object of the present invention is to provide a suspension fork which provides not only damping effect upon sudden impact, but also rebound restraint. In other words, the present invention suspension fork can provide damping effect to the telescoping assemblies not only when the inner tube slides into the outer tube from its balanced position, but also when the inner tube slides out of the outer tube from its balanced position.

Another object of the present invention is to provide a suspension fork which offers a rider the ability to adjust the damping effect of the elastomer systems to suit individual rider preference and weight. The elastomer bumper mechanism offers two levels of adjustment. At the first level, wide range adjustment can be achieved by replacing or exchanging the elastomers of the elastomer assembly. More importantly, at the second level, fine tuning can be achieved by using an adjuster assembly to preload the elastomers.

Another object of the present invention is to provide a suspension fork which utilizes second stage elastomers to prevent hard contact between the bottom end of the inner tube and the outer tube when the inner tube crushes into the outer tube.

A further object of the present invention is to provide a design which can also be used for rear suspension forks.

A still further object of the present invention is to provide a suspension fork which has a mechanism in its telescoping assemblies for converting the travel distance of the inner tube between a standard travel distance and a long travel distance.

An additional object of the present invention is to have a tapering wall "butted" chromoly and aluminum tube for reduced weight and increased strength.

One of the novel features of the present invention is the feature of utilizing a compression rod within the telescoping system. The compression rod is designed and constructed to be engaged with two sets of elastomers for the purpose of damping the telescoping suspension system for not only compression, but also expansion. In other words, the compression rod is designed and utilized in a manner that it engages with different sets of elastomers either when the inner tube is sliding into the outer tube from their balancing position, or when the inner tube is sliding out of the outer tube from their balancing position. Therefore, the present invention suspension fork can provide damping for not only compression, but also rebound.

Another one of the novel features of the present invention is the feature of utilizing an adjuster for fine tuning the preload and firmness of the elastomers. Each rider can fine-tune the preload on the elastomers to suit the rider's individual riding preference and body weight.

Still another one of the novel features of the present invention is the feature of utilizing second stage elastomers for providing secondary damping due to high impact and preventing the upper leg from crushing into the lower leg. The second stage elastomers provide full travel of the inner tubes in all conditions with a positive bottom stop.

An additional one of the novel features of the present invention is the feature of providing the rider with an option of converting the fork between standard and long travel distances. This feature is also related to the special design and construction of the compression rod and the arrangement of the compression and rebound elastomers.

Still an additional one of the novel features of the present invention is the feature of tapering the sidewall thickness of the inner tube from top to bottom to reduce the total weight of the fork without sacrificing the strength of the fork.

Described generally, the present invention is a precision suspension fork for bicycles. The present invention suspension fork utilizes a telescoping suspension system for each of its fork legs. The telescoping suspension system includes an outer tube, an inner tube slidably engaged with the outer tube, and a compression rod slidably engaged with the inner tube. The compression rod has a compression flange and a spaced apart rebound flange at a first end, and a positive stop clip at a location adjacent to, but spaced apart from, an opposite second end.

The present invention suspension system also includes a compression elastomer assembly positioned between the first end of the inner tube and the compression flange of the compression rod to provide a compressive damping force when the outer and inner tubes are compressed from a balanced condition, a rebound elastomer assembly positioned between the rebound flange of the compression rod and the second end of the inner tube to provide a rebound damping force when the outer and inner tubes are extended from the balanced condition, and a second stage elastomer assembly positioned between the second end of the inner tube and the positive stop clip to provide a secondary compressive damping force when the inner tube crushes into the outer tube.

The present invention further includes an adjuster assembly which is provided to fine-tune the preload on the compression elastomers. In addition, the present invention provides a method of quick conversion between standard and long travel configurations by modifying the configuration of the compression and rebound elastomer assemblies.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the present invention precision suspension fork for bicycles.

FIG. 2 is a partial exploded perspective view of the precision suspension fork.

FIG. 3 is a cross-sectional view of a telescoping leg assembly in its balanced condition.

FIG. 6 is a cross-sectional view of the telescoping leg assembly in its compressed condition.

FIG. 7 is a cross-sectional view of the telescoping leg assembly in its rebound condition.

FIG. 8 is a cross-sectional view of the telescoping leg assembly converted into long travel condition.

DESCRIPTION OF THE PREFERRED EMBODIMENT

Figures 4, 5:
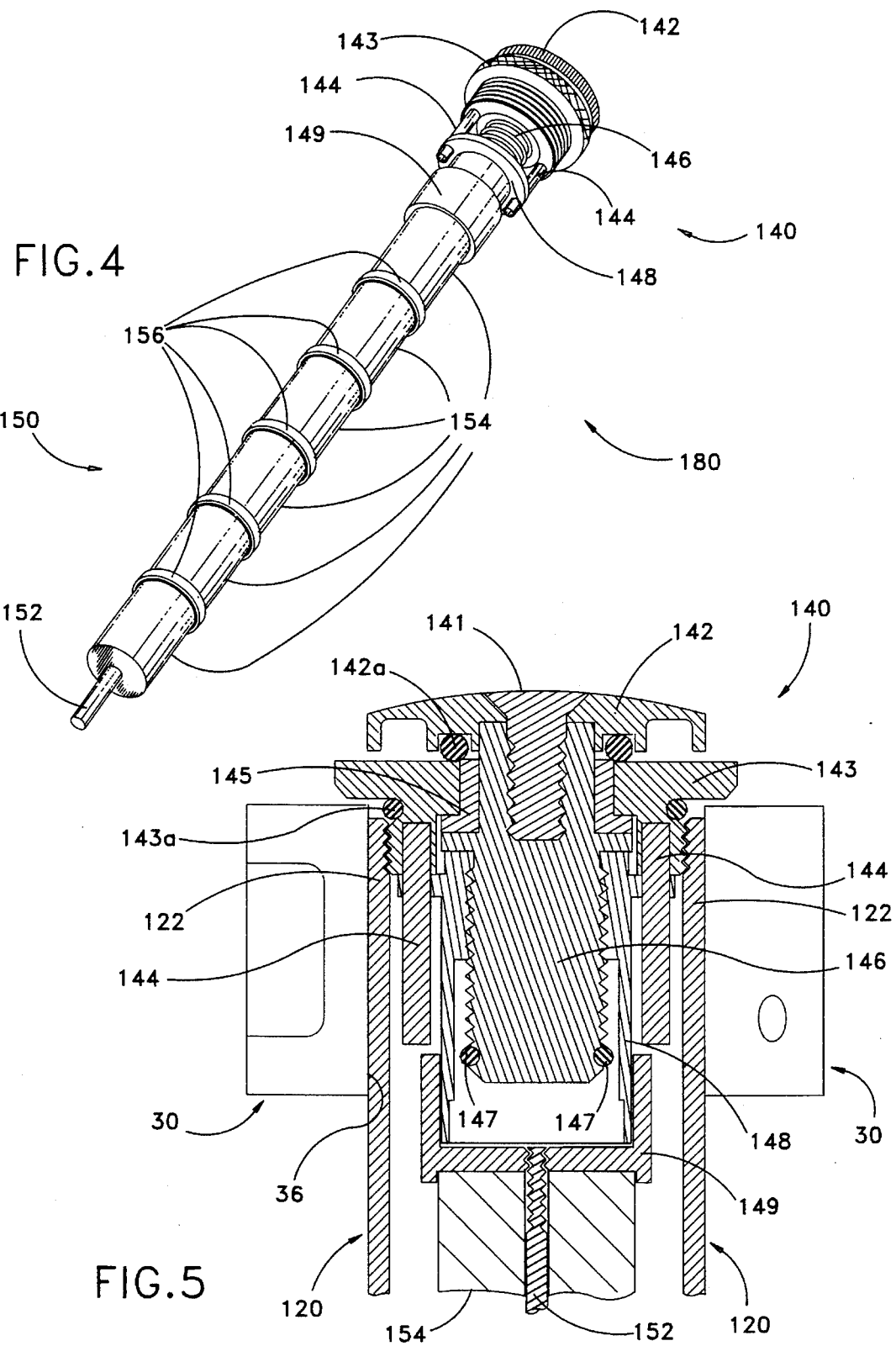
FIG. 4 is an enlarged perspective view of the compression elastomer assembly.
FIG. 5 is an enlarged perspective view of the adjuster assembly of the present invention precision suspension fork for bicycles.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIG. 1, there is shown at 10 one of the preferred embodiments of the present invention precision suspension fork for bicycles. The fork 10 is to be mounted between a frame part, typically the handlebars, and a wheel axle, typically front wheel axle, of a bicycle. The main components of fork 10 include a steerer 20, a crown 30, two parallel fork legs 40, two dropouts 50, a brake arch 60 and two brake flanges 70. The steerer 20 has a short tubular body 22 which has an upper end 24 and a lower end 26. The upper end 24 is connected to the handlebars of the bicycle (not shown). The lower end 26 is press fit to crown 30. Each fork leg 40 has an upper end 42 and a lower end 44. Each fork leg 40 further has a telescoping structure with an upper leg 46 and a lower leg 48 slidably engaged with each other. The upper ends 42 of the fork legs 40 are connected to the crown 30. Each dropout 50 is an integral piece having a plug portion 52 and a wheel axle catch portion 54. The plug portion 52 is press fit to a respective one of the lower ends 44 of the fork legs, and the wheel axle catch portion 54 is attached to a respective end of the wheel axle (not shown).

One of the novel features of the present invention is the design, construction and mounting of the brake arch 60 and brake flange 70. The brake arch 60 is an integral piece having a cross portion 62 with a rim brake cable receiver 63, and two leg portions 64. The brake flange 70 is also an integral short tubular piece having a brake arch receiver 72 at one end for mounting the brake arch 60, and a rim brake post receiver 74 at the other end for mounting a brake post (not shown in FIG. 1). It is noted that the brake post receiver 74 is spaced apart from the brake arch receiver 72 with a substantial distance therebetween, typically about one and a half inches (1.5").

This design has the following advantages. First, it distributes the stresses exerted on the fork legs 40 to separate locations. The bending stress between the upper leg 46 and the lower leg 48, and the twisting stress from the other fork leg 40 transmitted through the brake arch 60, are distributed to the location of the brake arch receiver 72 of the brake flange. Meanwhile, the braking force transmitted from the brake posts is distributed to a separate location where the brake post receiver 74 is located. Second, since the rib brake posts are now carried by the brake flanges 70, not the brake arch 60, the length of the legs 64 of the brake arch 60 are reduced because they do not need to be as long since they can reach the location where the brake posts are carried. This shorter leg feature increases the strength of the brake arch 60 and its ability to prevent the twisting of the two parallel fork legs 40.

Referring to FIG. 2, there is shown a partial exploded perspective view of the precision suspension fork 10. There is shown that the crown 30 has a body 32 with a central bore 34 and two opposite end bores 36. The lower end 26 of steerer 20 is press fit into central bore 34 of crown 30. This press fit attachment requires no intersecting slot at the center of the crown 30, and therefore avoids any compromise on the strength of the crown 30. There is also shown that the brake arch 60 is mounted to brake arch receiver 72 of brake flange 70 by mounting screws 65. There is further shown rim brake posts 76 are to be mounted to brake post receiver 74 of brake flange 70.

More particularly, there is shown in FIG. 2 a telescoping suspension system 100 contained in each fork leg 40. Each telescoping suspension system 100 includes an outer tube 110, an inner tube 120, a compression rod 130, an adjuster assembly 140, a compression elastomer assembly 150, a rebound elastomer assembly 160, and a second stage elastomer assembly 170.

Referring to both FIGS. 2 and 3, the outer tube 110 is typically the lower leg 48 of the fork leg 40 (as previously shown in FIG. 1). Shown in FIG. 2, outer tube 110 has an elongated hollow tubular body 111 with an upper end 112 and a lower end 114. The lower end 114 of the outer tube 110 is typically the lower end 44 of the fork leg 40. The upper end 112 is press fit with the brake flange 70, and the lower end 114 is press fit with the plug portion 52 of the dropout 50. The brake flange 70 also houses an upper bushing 116. A dust seal 117 is placed over the upper bushing 116 and retained in position by a retaining ring 118. A dust cover 119 finally covers the bushing assembly.

The inner tube 120 is typically the upper leg 46 of the fork leg 40 (as previously shown in FIG. 1). Shown in FIG. 2, inner tube 120 also has an elongated hollow tubular body 121 with an upper end 122 and a lower end 124. The upper end 122 of the inner tube 120 is typically the upper end 42 of the fork leg 40. The outer diameter of the inner tube 120 fits the inner diameter of the outer tube 110, so that the inner tube can be slidably engaged with the outer tube 110. An end plug 126 is press fit to the lower end 124 of the inner tube 120, and houses a lower bushing 127. The end plug 126 has an aperture for allowing the compression rod 130 to slide through.

Another one of the novel features of the present invention is that the sidewall of the inner tube 120 has a reduced thickness, and is tapered from the upper end 122 toward the lower end 124. In other words, the sidewall of the inner tube is thicker towards its upper end 122 and thinner towards its lower end 124. This feature reduces the weight of the inner tube 120, and thereby the overall weight of the fork tube 10, without sacrificing the strength at upper leg 46 of fork leg 40. It ensures that the fork leg 40 has adequate strength at its upper leg 46 where most heavy stress occurs.

One of the most important novel features of the present invention is the design, construction and application of the compression rod 130. As shown in FIGS. 2 and 3, the compression rod 130 has an elongated body 131 with an internal bore 132. The outer diameter of the compression rod 130 is smaller that the inner diameter of the inner tube 120. The compression rod 130 has an upper portion 133 with an upper end 134. An integral compression flange 135 is positioned at the upper end 134, and an integral rebound flange 136 is positioned at the upper portion 133 and spaced apart from the upper end 134. The compression rod 130 also has a lower portion 137 with a lower end 138. A positive stop clip 139 is attached at the lower portion 137 and spaced apart from the lower end 138 of the compression rod 130.

The positive stop clip 139 is detachable for allowing the compression rod 130 to be placed through the inner tube 120 from the upper end 122 thereof and have the lower portion 137 of the compression rod 130 extend out from the lower end 124 of the inner tube 120 through the end plug 126 thereof. A clip slot 139a is provided on the lower portion 137 of the compression rod 130 and located spaced apart from the lower end 138 of the compression rod 130. The lower end 138 of the compression rod 130 is affixed to the plug portion 52 of the dropout 50 by a small screw 56. In other words, the lower end 138 of the compression rod 130 is coupled with the lower end 114 of the outer leg 110. The functions of the various parts of the compression rod 130 will be explained later.

Referring to FIGS. 2 and 5, the adjuster assembly 140 includes a knob screw 141, a knob 142, a knob O-ring 142a, a cap 143, a cap O-ring 143a, a pair of dowel pins 144, a bushing 145, an adjuster screw 146, a retaining ring 147, a spool 148, and an elastomer adapter 149.

The cap 143 is mounted on the upper end 122 of the inner tube 120. The cap 143 can be unthreaded and removed from the upper end 122 of the inner tube 120, and the cap O-ring 143a is provided for easy turning of the cap 143. The spool 148 is slidably engaged with the cap 143 through the two dowel pins 144. The adjuster screw 146 is threadedly engaged with the spool 148, and is driven by the knob 142 which is coupled to the adjuster screw 146 by the knob screw 141 and is accessible from outside of the upper end 122 of the inner tube 120. The knob O-ring 142a and bushing 145 are provided for easy turning of knob 142 and adjuster screw 146. When the adjuster screw 146 is rotated by turning the knob 142, it drives the spool 148 up or down on the dowel pins 144. The elastomer adapter 149 is press fit with spool 148.

Referring to FIGS. 2, 3 and 5, the compression elastomer assembly 150 includes an elastomer rod 152, a multiplicity of compression elastomers 154, and a multiplicity of elastomer washers 156. The upper end of the elastomer rod 152 is threadedly attached to the elastomer adapter 149 of the adjuster assembly 140, as shown in FIG. 5. The lower end of the elastomer rod 152 is received by the internal bore 132 of the compression rod 130, as shown in FIG. 3.

The compression elastomers 154 are placed on the elastomer rod 152 in series and partitioned by the elastomer washers 154. The elastomer washers 154 may be flat disc-shaped washers. The elastomer washers may also be cup washers each having recesses on both sides for keeping the compression elastomers 154 in place, as shown in FIG. 3. In one of the preferred embodiments, there are six (6) one-inch (1") polyurethane elastomers and five (5) cup washers used for the compression assembly 150.

Referring to FIG. 4, when the elastomer rod 152 is attached to the elastomer adapter 149, the adjuster assembly 140 and the compression elastomer assembly 150 are coupled together as a compression piston unit 180. The compression piston unit 180 is accessible at the upper end 122 of the inner tube 120, and can be easily removed therefrom by unscrewing the cap 143 of the adjuster assembly 140. Once removed from the inner tube, a rider of the bicycle can modify the configuration of the compression elastomers, which offers a wide range of adjustment to suit the individual riding preference and weight.

Once assembled, the compression elastomers 154 are positioned inside the inner tube 120 between the elastomer adapter 149 of the adjuster assembly 140 and the compression flange 135 of the compression rod 130. FIG. 3 shows a balanced condition of the telescoping suspension system 100.

One of the novel features of the present invention is the ability to fine-tune the preload on the compression elastomers to suit the individual desire or preference of each rider as to the stiffness or firmness of the telescoping suspension system 100. As shown in FIG. 5, this fine-tuning adjustment can be simply made by turning the knob 142 of the adjuster assembly 140, which will drive spool 148 up or down, to adjust the preload applied on the compression elastomers 152 through the elastomer adapter 149. This will modify the initial travel for small bumps, but will not limit the full travel for large bumps. This adjustment can be performed without any tool or any dissemblement of the telescoping suspension system.

Referring to FIG. 6, when the telescoping suspension system 100 is compressed from its balanced condition, i.e., when the inner tube 120 slides into the outer tube 110, the compression elastomers 154 are compressed between the elastomer adapter 149 of the adjuster assembly 140 and the compression flange 135 of the compression rod 130, and provide a compressive damping force to the telescoping suspension system 100.

Another one of the novel features of the present invention is the design, construction and application of the rebound elastomer assembly 160. As shown in FIGS. 2 and 3 in one of the preferred embodiments of the present invention, the rebound elastomer assembly 160 includes two half-inch (0.5") rebound elastomers 162. The rebound elastomers 162 are placed on the compression rod 130 and positioned inside the inner tube 120, between the rebound flange 136 of the compression rod 130 and the end plug 126 which is affixed at the lower end 124 of the inner tube 120.

As shown in FIG. 7, when the telescoping suspension system 100 rebounds from its balanced condition, during which the inner tube 120 slides out from the outer tube 110, the rebound elastomers 162 are compressed between the rebound flange 136 of the compression rod 130 and the lower end 124 of the inner tube 120 (via the end plug 126), and provide a rebound damping force to the telescoping suspension system 100. Therefore, the present invention telescoping fork provides not only compression damping, but also rebound restraint.

It can be seen that the end plug 126 of the present invention serves two purposes. First, it maintains the concentric alignment of the compression rod 130 with respect to the inner tube 120 and in turn, maintains the concentric alignment of the compression rod 130 with respect to the outer tube 110. Second, it provides an engagement with the rebound elastomers 162 at the lower end 124 of the inner tube 120.

An additional novel feature of the present invention is the design, construction and application of the second stage elastomer assembly 170. As shown in FIGS. 2 and 3 in one of the preferred embodiments of the present invention, the second stage elastomer assembly 170 includes one positive stop elastomer 172 placed on the compression rod 130. The positive stop elastomer 172 is positioned below the lower end 124 of the inner tube 120, and between the lower end 124 of the inner tube 120 and the positive stop clip 139 of the compression rod. When the bicycle wheel encounters a large and sudden bump, it is possible that the inner tube 120 will travel an excessive distance into the outer tube 110. The positive stop clip 139 provides a positive stop to prevent the inner tube 120 from crushing into the outer tube 110 which may result in serious injury to the rider, and the positive stop elastomer 172 provides a secondary compressive damping force to the inner tube 120. In this sense, the compression elastomers 154 can be regarded as the first stage compression elastomers, and the positive stop elastomer 172 can be regarded as the second stage compression elastomer.

A further novel feature of the present invention is the ability to easily convert the fork 10 from a standard travel configuration to a long travel configuration. Referring to FIG. 3, in one of the preferred embodiments of the present invention, there are six (5) one inch (1") compression elastomers 152. This is the standard travel configuration which gives an approximately two inches (2") standard travel distance of the inner tube 120.

However, when the rider desires, this standard travel configuration can be easily converted to a long travel configuration because of the design, construction and application of the compression rod 130 and rebound assembly 160. Referring to FIG. 8 which shows the long travel configuration, the conversion can be simply done by removing one of the half-inch (0.5") rebound elastomer 162 from the compression rod and placing an additional half-inch (0.5") compression elastomer 158 with an additional washer 159 at the lower end of the elastomer rod 152. With the addition of the new compression elastomer 158, the compression assembly 150 provides an approximately two and a half inch (2.5") long travel distance of the inner tube 120. With the removal of one of the half inch (0.5") rebound elastomers 162, a clearance is provided to allow the lower end 124 of the inner tube 120 to move up.

In addition, a conversion back to the standard travel configuration can be simply performed by removing the additional compression elastomer 158 and putting one rebound elastomer 162 back. Therefore, it can be seen that the present invention has provided an easy method for converting the bicycle fork between the standard travel and long travel configurations.

It is noted that the present invention telescoping suspension system can be utilized not only on the front fork, but also on the rear fork, of a bicycle. When utilized on the rear fork of the bicycle, each leg of the rear fork has a telescoping suspension system substantially similar as the ones depicted in FIGS. 3 and 6 through 8.

It is further noted that because of the design and construction of the present invention telescoping suspension system, it really does not matter whether the outer or inner tube serves as the upper or lower leg of a bicycle fork. If the outer tube serves as the upper leg and the inner tube the lower leg, the distal end of the outer tube (end 114) will be connected to the crown or bicycle frame, and the distal end of the inner tube (end 122) will be connected to the wheel axle through a dropout.

It should be appreciated that one of the most important novel feature of the present invention suspension fork is the design and construction of the compression rod. The critical feature of the compression rod is that it is slidably engaged with the proximal or inner end of the inner tube (end 124) and has at least one flange on each side of the proximal or inner end of the inner tube. The location of the flange located inside the inner tube (flange 135 or 136) makes it possible to have the compression rod engaged with compression elastomers positioned between the flange and the distal or outer end of the inner tube (end 122), and also makes it possible to have the compression rod engaged with rebound elastomers positioned between the flange and the proximal or inner end of the inner tube (end 124). The location of the flange located outside the inner tube (clip 139) makes it possible to have the compression rod engaged with second stage compression elastomers positioned between the flange and the proximal or inner end of the inner tube (end 124). Of course it is possible to use only one set of compression elastomers. Furthermore, it is conceivable to use other types of resilient members, such as coil springs, to replace, or in combination with, the compression and rebound elastomers.

Defined in detail, the present invention is a suspension fork mounted between handlebars and front wheel axle of a bicycle, comprising: (a) a steerer having an upper end and a lower end, the upper end connected to the handlebars; (b) a crown having a body with a central bore and two opposite end bores, the lower end of the steerer being press fit into the central bore of the crown; (c) two parallel fork legs each having an upper end extending through a respective one of the end bores of the crown and secured to the crown, and a lower end attached to the front wheel axle, each fork leg further having a telescoping suspension system with an upper leg and a lower leg slidably engaged to each other; (d) a brake arch having a cross-portion with a rim brake cable receiver and two leg-portions; (e) a brake flange coupled to each one of the two fork legs for mounting one of the two legs of the brake arch and a rim brake post in a spaced apart relationship; (f) the telescoping suspension system comprising an outer tube which is the lower leg, the outer tube having an elongated hollow tubular body with an upper end and a lower end, the upper end being press fit with the brake flange, and the lower end being the lower end of the telescoping suspension system; (g) the telescoping suspension system further comprising an inner tube which is the upper leg, the inner tube having an elongated hollow tubular body with an upper end and a lower end, the body having a sidewall with reduced thickness tapered from the upper end toward the lower end, the upper end being the upper end of the telescoping suspension system, and the inner tube slidably engaged to the outer tube with the lower end of the inner tube sliding inside the outer tube; (h) the telescoping suspension system further comprising a compression rod, the compression rod having an elongated body with an internal bore, the body having an upper portion with an upper end and a lower portion with a lower end, the compression rod further having an integral compression flange positioned at the upper end, an integral rebound flange positioned at the upper portion and spaced apart from the upper end of the compression rod, and a detachable positive stop clip attached at the lower portion and spaced apart from the lower end of the compression rod, the compression rod slidably engaged to the inner tube with the upper portion of the compression rod sliding inside the inner tube, and the lower end of the compression rod coupled to the lower end of the outer tube; (i) an adjuster assembly having a cap mounted on the upper end of the inner tube, a spool slidably engaged with the cap, an adjuster screw threadedly engaged with the spool, a knob accessible from outside of the upper end of the inner tube for rotating the adjuster screw to drive the spool, and an elastomer adapter attached to the spool; (j) a compression elastomer assembly having an elastomer rod, the elastomer rod having an upper end secured to the elastomer adapter of the adjuster assembly and a lower end received by the internal bore of the compression rod, the compression elastomer assembly further having a multiplicity of compression elastomers placed on the elastomer rod in series and partitioned by a multiplicity of elastomer washers, and positioned inside the inner tube between the elastomer adapter of the adjuster assembly and the compression flange of the compression rod to provide an easy fine-tuning of a preload on the compression elastomers by turning the knob of the adjuster assembly, and also to provide a compressive damping force when the outer and inner tubes are compressed from a balanced condition; (k) a rebound elastomer assembly having at least two rebound elastomers placed on the compression rod and positioned inside the inner tube and between the rebound flange and the lower end of the inner tube to provide a rebound damping force when the outer and inner tubes are extended from the balanced condition; (l) a second stage elastomer assembly having at least one positive stop elastomer placed on the compression rod and positioned outside the inner tube and between the lower end of the inner tube and the positive stop clip to provide a secondary compressive damping force when the inner tube travels into the outer tube excessively; and (m) means for converting the suspension fork from a standard travel configuration to a long travel configuration, including one of the at least two rebound elastomers, which can be removed from the compression rod, and an additional compression elastomer, which can be added to the compression elastomer assembly, so that the inner and outer tubes can balance at an extended position to increase a compressive travel distance of the inner tube; (n) whereby the suspension fork provides not only compressive but also rebound damping, and positive stop damping, and further provides fine-tuning ability of the preload, and easy conversion between the standard and long travel configurations.

Defined broadly, the present invention is a telescoping suspension system for a suspension fork which is mounted between a frame part and a wheel axle of a bicycle and has two parallel legs each utilizing the telescoping suspension system, comprising: (a) an outer tube having an elongated hollow tubular body with a first end and a second end; (b) an inner tube having an elongated hollow tubular body with a first end and a second end, the body having a sidewall with reduced thickness tapered from the first end toward the second end, and the inner tube slidably engaged to the outer tube with the second end of the inner tube sliding inside the outer tube; (c) a compression rod having a first end and a first portion adjacent to the first end, and a second end and a second portion adjacent to the second end, the compression rod further having an integral compression flange positioned at the first end, an integral rebound flange positioned at the first portion and spaced apart from the first end of the compression rod, and a positive stop member attached at the second portion and spaced apart from the second end of the compression rod, the compression rod slidably engaged to the inner tube with the first portion of the compression rod sliding inside the inner tube, and the second end of the compression rod coupled to the second end of the outer tube; (d) an adjuster assembly having a cap mounted on the first end of the inner tube, a spool slidably engaged with the cap, and an adjuster screw threadedly engaged with the spool for driving the spool; (e) a compression elastomer assembly having a multiplicity of compression elastomers, and positioned in series inside the inner tube between the spool of the adjuster assembly and the compression flange of the compression rod to provide an easy fine-tuning of a preload on the compression elastomers by turning the knob of the adjuster assembly, and also to provide a compressive damping force when the outer and inner tubes are compressed from a balanced condition; (f) a rebound elastomer assembly having at least two rebound elastomers placed on the compression rod and positioned inside the inner tube and between the rebound flange and the second end of the inner tube to provide a rebound damping force when the outer and inner tubes are extended from the balanced condition; (g) a second stage elastomer assembly having at least one positive stop elastomer placed on the compression rod and positioned outside the inner tube and between the second end of the inner tube and the positive stop member to provide a secondary compressive damping force when the inner tube travels into the outer tube excessively; and (h) means for converting the suspension fork from a standard travel configuration to a long travel configuration, including one of the at least two rebound elastomers, which can be removed from the compression rod, and an additional compression elastomer, which can be added to the compression elastomer assembly, so that the inner and outer tubes can balance at an extended position to increase a compressive travel distance of the inner tube; (i) whereby the suspension fork provides not only compressive but also rebound damping, and positive stop damping, and further provides fine-tuning ability of the preload, and easy conversion between the standard and long travel configurations.

Defined more broadly, the present invention is a telescoping suspension system for a leg of a suspension fork which is mounted between a frame part and a wheel axle of a bicycle, comprising: (a) an outer tube having an elongated hollow tubular body with a first end and a second end; (b) an inner tube having an elongated hollow tubular body with a first end and a second end, the inner tube slidably engaged to the outer tube with the second end of the inner tube sliding inside the outer tube; (c) a compression rod having a first end and a second end, the compression rod further having a compression flange positioned at the first end, a rebound flange positioned adjacent to the first end but spaced apart from the compression flange, and a positive stop member attached to the compression rod at a location adjacent to but spaced apart from the second end and spaced apart from the rebound flange, the compression rod slidably engaged to the inner tube with the first end of the compression rod sliding inside the inner tube, and the second end of the compression rod coupled to the second end of the outer tube; (d) an adjuster assembly mounted on the first end of the inner tube, the adjuster assembly having a slidable spool, and an adjuster screw threadedly engaged with the spool for driving the spool; (e) a compression elastomer assembly having at least one compression elastomer positioned inside the inner tube between the adjuster assembly and the compression flange of the compression rod to provide an easy fine-tuning of a preload on the compression elastomers, and also to provide a compressive damping force when the outer and inner tubes are compressed from a balanced condition; (f) a rebound elastomer assembly having at least one rebound elastomer placed on the compression rod and positioned inside the inner tube and between the rebound flange and the second end of the inner tube to provide a rebound damping force when the outer and inner tubes are extended from the balanced condition; and (g) a second stage elastomer assembly having at least one positive stop elastomer placed on the compression rod and positioned between the second end of the inner tube and the positive stop member to provide a secondary compressive damping force when the inner tube travels into the outer tube excessively; (h) whereby the suspension fork provides not only compressive but also rebound damping, and positive stop damping, and further provides fine-tuning ability of the preload.

Defined even more broadly, the present invention is a suspension system for a leg of a bicycle fork, comprising: (a)

an elongated tube having a first end and a second end; (b) a compression rod having a first portion and a second portion, at least one flange located at the first portion, the compression rod slidably engaged to the elongated tube with the first portion of the compression rod sliding inside the elongated tube; (c) at least one compression elastomer positioned between the first end of the tube and the at least one flange of the compression rod to provide a compressive damping force when the fork leg is compressed from a balanced condition; and (d) at least one rebound elastomer positioned between the at least one flange of the compression rod and the second end of the elongated tube to provide a rebound damping force when the fork leg is extended from the balanced condition; (e) whereby the suspension fork provides not only compressive but also rebound damping.

Also defined even more broadly, the present invention is a suspension system for a leg of a bicycle fork, comprising: (a) an elongated tube having a first end and a second end; (b) a compression rod having a first portion and a second portion, at least one flange located at each portion, the compression rod slidably engaged to the elongated tube with the first portion of the compression rod sliding inside the elongated tube; (c) at least one rebound elastomer positioned between the at least one flange located at the first portion of the compression rod and the second end of the elongated tube to provide a rebound damping force when the fork leg is extended from the balanced condition; and (d) at least one compression elastomer positioned between the at least one flange located at the second portion of the compression rod and the second end of the tube to provide a compressive damping force when the fork leg is compressed from a balanced condition; (e) whereby the suspension fork provides not only compressive but also rebound damping.

Alternatively defined, the present invention is a method for providing both compression and rebound damping to a leg of a bicycle fork, compressing the steps of: (a) providing an elongated tube which has a first end and a second end; (b) providing a compression rod which has a first portion, a second portion, and at least one flange located at the first portion, and slidably engaging the compression rod to the elongated tube with the first portion of the compression rod sliding inside the elongated tube; (c) positioning at least one compression elastomer between the first end of the tube and the at least one flange of the compression rod to provide a compressive damping force when the fork leg is compressed from a balanced condition; and (d) positioning at least one rebound elastomer between the at least one flange of the compression rod and the second end of the elongated tube to provide a rebound damping force when the fork leg is extended from the balanced condition.

Also alternatively defined, the present invention is a method for providing both compression and rebound damping to a leg of a bicycle fork, compressing the steps of: (a) providing an elongated tube which has a first end and a second end; (b) providing a compression rod which has a first portion, a second portion, and at least one flange located at each portion, and slidably engaging the compression rod to the elongated tube with the first portion of the compression rod sliding inside the elongated tube; (c) positioning at least one rebound elastomer between the at least one flange located at the first portion of the compression rod and the second end of the elongated tube to provide a rebound damping force when the fork leg is extended from the balanced condition; and (d) positioning at least one compression elastomer between the at least one flange located at the second portion of the compression rod and the second end of the tube to provide a compressive damping force when the fork leg is compressed from a balanced condition.

Again defined alternatively, the present invention is a method for converting a bicycle fork between a standard travel configuration and a long travel configuration, compressing the steps of: (a) providing an elongated tube which has a first end and a second end; (b) providing a compression rod which has a first portion, a second portion, and at least one flange located at the first portion, and slidably engaging the compression rod to the elongated tube with the first portion of the compression rod sliding inside the elongated tube; (c) positioning at least one compression elastomer between the first end of the tube and the at least one flange of the compression rod, and positioning at least two rebound elastomer between the at least one flange of the compression rod and the second end of the elongated tube, to set up the fork to the standard travel configuration; and (d) removing one of the at least two rebound elastomer and adding at least one additional compression elastomer to convert the fork to the standard travel configuration.

Still defined alternatively, the present invention is a method for converting a bicycle fork between a standard travel configuration and a long travel configuration, compressing the steps of: (a) providing an elongated tube which has a first end and a second end; (b) providing a compression rod which has a first portion, a second portion, and at least one flange located at the first portion, and slidably engaging the compression rod to the elongated tube with the first portion of the compression rod sliding inside the elongated tube; (c) positioning at least two compression elastomer between the first end of the tube and the at least one flange of the compression rod, at least one rebound elastomer between the at least one flange of the compression rod and the second end of the elongated tube, to set up the fork to the long travel configuration; and (d) removing one of the at least two compression elastomer and adding at least one additional rebound elastomer to convert the fork to the long travel configuration.

Additionally defined alternatively, the present invention is a method for converting a bicycle fork between a standard travel configuration and a long travel configuration, compressing the steps of: (a) providing an elongated tube which has a first end and a second end; (b) providing a compression rod which has a first portion, a second portion, and at least one flange located at each portion, and slidably engaging the compression rod to the elongated tube with the first portion of the compression rod sliding inside the elongated tube; (c) positioning at least two rebound elastomer between the at least one flange located at the first portion of the compression rod and the second end of the elongated tube, and positioning at least one compression elastomer between the at least one flange located at the second portion of the compression rod and the second end of the tube, to set up the fork to the standard travel configuration; and (d) removing one of the at least two rebound elastomer and adding at least one additional compression elastomer to convert the fork to the long travel configuration.

Further defined alternatively, the present invention is a method for converting a bicycle fork between a standard travel configuration and a long travel configuration, compressing the steps of: (a) providing an elongated tube which has a first end and a second end; (b) providing a compression rod which has a first portion, a second portion, and at least one flange located at each portion, and slidably engaging the compression rod to the elongated tube with the first portion of the compression rod sliding inside the elongated tube; (c) positioning at least one rebound elastomer between the at least one flange located at the first portion of the compression rod and the second end of the elongated tube, and positioning at least two compression elastomer between the at least one flange located at the second portion of the compression rod and the second end of the tube, to set up the fork to the long travel configuration; and (d) removing one of the at least two compression elastomer and adding at least one additional rebound elastomer to convert the fork to the standard travel configuration.

Alternatively defined broadly, the present invention is a method for converting a bicycle fork between a standard travel configuration and a long travel configuration, compressing the steps of: (a) slidably engaging an elongated tube with a compression rod; (b) positioning a compression elastomer assembly between the elongated tube and the compression rod to provide a compressive damping force when the fork leg is compressed from a balanced condition; (c) positioning a rebound elastomer assembly between the elongated tube and the compression rod to provide a rebound damping force when the fork leg is extended from the balanced condition; and (d) modifying the compression and rebound elastomer assemblies correspondingly to convert the fork between the standard and long travel configurations.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A suspension fork for mounting to a front wheel axle of a bicycle, comprising:

a. a steerer having an upper end and a lower end;
   b. a crown having a body with a central bore and two opposite end bores, said lower end of said steerer being press fit into the central bore of the crown;
   c. two parallel fork legs each having an upper end extending through a respective one of said end bores of said crown and secured to said crown, and a lower end attached to said front wheel axle, each fork leg further having a telescoping suspension system with an upper leg and a lower leg slidably engaged to each other;
   d. a brake arch having a cross-portion with a rim brake cable receiver and two leg-portions;
   e. a brake flange coupled to each one of said two fork legs for mounting one of said two legs of said brake arch and a rim brake post in a spaced apart relationship;
   f. said telescoping suspension system comprising an outer tube which is said lower leg, the outer tube having an elongated hollow tubular body with an upper end and a lower end, the upper end being press fit with said brake flange, and the lower end being said lower end of said telescoping suspension system;
   g. said telescoping suspension system further comprising an inner tube which is said upper leg, the inner tube having an elongated hollow tubular body with an upper end and a lower end, the body having a sidewall with reduced thickness tapered from the upper end toward the lower end, the upper end being said upper end of said telescoping suspension system, and the inner tube slidably engaged to said outer tube with the lower end of the inner tube sliding inside said outer tube;
   h. said telescoping suspension system further comprising a compression rod, the compression rod having an elongated body with an internal bore, the body having an upper portion with an upper end and a lower portion with a lower end, the compression rod further having an integral compression flange positioned at the upper end, an integral rebound flange positioned at the upper portion and spaced apart from the upper end of the compression rod, and a detachable positive stop clip attached at the lower portion and spaced apart from the lower end of the compression rod, the compression rod slidably engaged to said inner tube with the upper portion of the compression rod sliding inside said inner tube, and the lower end of the compression rod coupled to said lower end of said outer tube;
   i. an adjuster assembly having a cap mounted on said upper end of said inner tube, a spool slidably engaged with said cap, an adjuster screw threadedly engaged with the spool, a knob accessible from outside of said upper end of said inner tube for rotating the adjuster screw to drive the spool, and an elastomer adapter attached to the spool;
   j. a compression elastomer assembly having an elastomer rod, the elastomer rod having an upper end secured to said elastomer adapter of said adjuster assembly and a lower end received by said internal bore of said compression rod, the compression elastomer assembly further having a multiplicity of compression elastomers placed on the elastomer rod in series and partitioned by a multiplicity of elastomer washers, and positioned inside said inner tube between said elastomer adapter of said adjuster assembly and said compression flange of said compression rod to provide an easy fine-tuning of a preload on said compression elastomers by turning said knob of said adjuster assembly, and also to provide a compressive damping force when said outer and inner tubes are compressed from a balanced condition;
   k. a rebound elastomer assembly having at least two rebound elastomers placed on said compression rod and positioned inside said inner tube and between said rebound flange and said lower end of said inner tube to provide a rebound damping force when said outer and inner tubes are extended from said balanced condition;
   l. a second stage elastomer assembly having at least one positive stop elastomer placed on said compression rod and positioned outside said inner tube and between said lower end of said inner tube and said positive stop clip to provide a secondary compressive damping force when said inner tube travels into said outer tube excessively; and
   m. means for converting said suspension fork from a standard travel configuration to a long travel configuration, including one of said at least two rebound elastomers, which can be removed from said compression rod, and an additional compression elastomer, which can be added to said compression elastomer assembly, so that said inner and outer tubes can balance at an extended position to increase a compressive travel distance of said inner tube;

n. whereby said suspension fork provides not only compressive but also rebound damping, and positive stop damping, and further provides fine-tuning ability of said preload, and easy conversion between said standard and long travel configurations.

2. The invention as defined in claim 1 further comprising a pair of dropouts each attached to said lower ends of said outer tubes, each dropout having an outer tube plug press fit to said lower end of said outer tube, and an integral wheel axle catch for receiving said wheel axle.

3. The invention as defined in claim 2 wherein said lower end of said compression rod is affixed to said outer tube plug.

4. The invention as defined in claim 1 further comprising an inner tube plug press fit to said lower end of said inner tube, the inner tube plug having an aperture for allowing said compression rod to slide through.

5. The invention as defined in claim 1 wherein said lower portion of said compression rod has a clip slot for receiving said positive stop clip.

6. A telescoping suspension system for a suspension fork which is mounted between a frame part and a wheel axle of a bicycle and has two parallel legs each utilizing the telescoping suspension system, comprising:
   a. an outer tube having an elongated hollow tubular body with a first end and a second end;
   b. an inner tube having an elongated hollow tubular body with a first end and a second end, the body having a sidewall with reduced thickness tapered from the first end toward the second end, and the inner tube slidably engaged to said outer tube with the second end of the inner tube sliding inside said outer tube;
   c. a compression rod having a first end and a first portion adjacent to the first end, and a second end and a second portion adjacent to the second end, the compression rod further having an integral compression flange positioned at the first end, an integral rebound flange positioned at the first portion and spaced apart from the first end of the compression rod, and a positive stop member attached at the second portion and spaced apart from the second end of the compression rod, the compression rod slidably engaged to said inner tube with the first portion of the compression rod sliding inside said inner tube, and the second end of the compression rod coupled to said second end of said outer tube;
   d. an adjuster assembly having a cap mounted on said first end of said inner tube, a spool slidably engaged with said cap, and an adjuster screw threadedly engaged with the spool for driving the spool;
   e. a compression elastomer assembly having a multiplicity of compression elastomers, and positioned in series inside said inner tube between said spool of said adjuster assembly and said compression flange of said compression rod to provide an easy fine-tuning of a preload on said compression elastomers by turning said knob of said adjuster assembly, and also to provide a compressive damping force when said outer and inner tubes are compressed from a balanced condition;
   f. a rebound elastomer assembly having at least two rebound elastomers placed on said compression rod and positioned inside said inner tube and between said rebound flange and said second end of said inner tube to provide a rebound damping force when said outer and inner tubes are extended from said balanced condition;
   g. a second stage elastomer assembly having at least one positive stop elastomer placed on said compression rod and positioned outside said inner tube and between said second end of said inner tube and said positive stop member to provide a secondary compressive damping force when said inner tube travels into said outer tube excessively; and
   h. means for converting said suspension fork from a standard travel configuration to a long travel configuration, including one of said at least two rebound elastomers, which can be removed from said compression rod, and an additional compression elastomer, which can be added to said compression elastomer assembly, so that said inner and outer tubes can balance at an extended position to increase a compressive travel distance of said inner tube;
   i. whereby said suspension fork provides not only compressive but also rebound damping, and positive stop damping, and further provides fine-tuning ability of said preload, and easy conversion between said standard and long travel configurations.

7. The invention as defined in claim 6 further comprising an outer tube plug press fit to said second end of said outer tube.

8. The invention as defined in claim 7 wherein said second end of said compression rod is affixed to said outer tube plug.

9. The invention as defined in claim 6 further comprising an inner tube plug press fit to said second end of said inner tube, the inner tube plug having an aperture for allowing said compression rod to slide through.

10. The invention as defined in claim 6 wherein said positive stop member is a clip detachably clipped into a slot located at said second portion of said compression rod.

11. A telescoping suspension system for a leg of a suspension fork which is mounted between a frame part and a wheel axle of a bicycle, comprising:
   a. an outer tube having an elongated hollow tubular body with a first end and a second end;
   b. an inner tube having an elongated hollow tubular body with a first end and a second end, the inner tube slidably engaged to said outer tube with the second end of the inner tube sliding inside said outer tube;
   c. a compression rod having a first end and a second end, the compression rod further having a compression flange positioned at the first end, a rebound flange positioned adjacent to the first end but spaced apart from the compression flange, and a positive stop member attached to the compression rod at a location adjacent to but spaced apart from the second end and spaced apart from the rebound flange, the compression rod slidably engaged to said inner tube with the first end of the compression rod sliding inside said inner tube, and the second end of the compression rod coupled to said second end of said outer tube;
   d. an adjuster assembly mounted on said first end of said inner tube, the adjuster assembly having a slidable spool, and an adjuster screw threadedly engaged with the spool for driving the spool;
   e. a compression elastomer assembly having at least one compression elastomer positioned inside said inner tube between said adjuster assembly and said compression flange of said compression rod to provide an easy fine-tuning of a preload on said compression elastomers, and also to provide a compressive damping force when said outer and inner tubes are compressed from a balanced condition;

f. a rebound elastomer assembly having at least one rebound elastomer placed on said compression rod and positioned inside said inner tube and between said rebound flange and said second end of said inner tube to provide a rebound damping force when said outer and inner tubes are extended from said balanced condition; and g. a second stage elastomer assembly having at least one positive stop elastomer placed on said compression rod and positioned between said second end of said inner tube and said positive stop member to provide a secondary compressive damping force when said inner tube travels into said outer tube excessively;

h. whereby said suspension fork provides not only compressive but also rebound damping, and positive stop damping, and further provides fine-tuning ability of said preload.

12. The invention as defined in claim 11 further comprising an outer tube plug press fit to said second end of said outer tube.

13. The invention as defined in claim 12 wherein said second end of said compression rod is affixed to said outer tube plug.

14. The invention as defined in claim 11 further comprising an inner tube plug press fit to said second end of said inner tube, the inner tube plug having an aperture for allowing said compression rod to slide through.

15. The invention as defined in claim 11 wherein said positive stop member is a clip detachably clipped into a slot located at said location adjacent to but spaced apart from the second end and spaced apart from the rebound flange.

16. A suspension system for a leg of a bicycle fork, comprising:

a. an elongated tube having a first end and a second end, and an outer tube having a lower end adapted to receive a bicycle wheel and an upper end slidably engaged with said elongated tube;

b. a compression rod having a first portion and a second portion, at least one flange located at the first portion, the compression rod secured to said lower end of said outer tube, and slidably engaged to said elongated tube with the first portion of the compression rod sliding inside said elongated tube;

c. at least one resilient compression member positioned between said first end of said tube and said at least one flange of said compression rod to provide a compressive damping force when said fork leg is compressed from a balanced condition;

d. at least one resilient rebound member positioned between said at least one flange of said compression rod and said second end of said elongated tube to provide a rebound damping force when said fork leg is extended from said balanced condition;

e. whereby said suspension fork provides not only compressive but also rebound damping; and f. a second stage compression assembly, including a positive stop member attached to a lower portion of said compression rod, and at least one second stage resilient compression member positioned between said second end of said elongated tube and said positive stop member to provide a secondary compressive damping force in response to excessive compressive travel of said elongated tube.

17. The invention as defined in claim 16 further comprising an adjuster assembly at said first end of said tube for applying adjustable preload on said at least one resilient compression member.

18. A method for providing both compression and rebound damping to a leg of a bicycle fork, comprising the steps of:

a. providing an elongated tube which has a first end and a second ends, and an outer tube having a lower end adapted to receive a bicycle wheel and an upper end slidably engaged with said elongated tube;

b. providing a compression rod secured to said lower end of said outer tube, and having a first portion, a second portion, and at least one flange located at the first portion, and slidably engaging the compression rod to said elongated tube with the first portion of the compression rod sliding inside said elongated tube;

c. positioning at least one resilient compression member between said first end of said elongated tube and said at least one flange of said compression rod to provide a compressive damping force when said fork leg is compressed from a balanced condition;

d. positioning at least one resilient rebound member between said at least one flange of said compression rod and said second end of said elongated tube to provide a rebound damping force when said fork leg is extended from said balanced condition; and e. attaching a positive stop member to a lower portion of said compression rod, and positioning at least one second stage resilient compression member between said second end of said elongated tube and said positive stop member to provide a secondary compressive damping force in response to excessive compressive travel of said elongated tube.

19. The invention as defined in claim 18 further comprising the step of utilizing an adjuster assembly at said first end of said tube to apply adjustable preload on said at least one resilient compression member.

20. A method for converting a bicycle fork between a standard travel configuration and a long travel configuration, comprising the steps of:

a. providing an elongated tube which has a first end and a second end;

b. providing a compression rod which has a first portion, a second portion, and at least one flange located at the first portion, and slidably engaging the compression rod to said elongated tube with the first portion of the compression rod sliding inside said elongated tube;

c. positioning at least one compression elastomer between said first end of said tube and said at least one flange of said compression rod, and positioning at least two rebound elastomers between said at least one flange of said compression rod and said second end of said elongated tube, to set up said fork to said standard travel configuration; and d. removing at least one of said at least two rebound elastomers and adding at least one additional compression elastomer to covert said fork to said long travel configuration.

21. A method for converting a bicycle fork between a long travel configuration and a standard travel configuration, comprising the steps of:

a. providing an elongated tube which has a first end and a second end;

b. providing a compression rod which has a first portion, a second portion, and at least one flange located at the first portion, and slidably engaging the compression rod to said elongated tube with the first portion of the compression rod sliding inside said elongated tube;

c. positioning at least two compression elastomers between said first end of said tube and said at least one flange of said compression rod, and positioning at least one rebound elastomer between said at least one flange of said compression rod and said second end of said elongated tube, to set up said fork to said long travel configuration; and d. removing at least one of said at least two compression elastomers and adding at least one additional rebound elastomer to convert said fork to said standard travel configuration.

22. A method for converting a bicycle fork between a standard travel configuration and a long travel configuration, comprising the steps of:

a. providing an elongated tube which has a first end and a second end;

b. providing a compression rod which has a first portion, a second portion, and at least one flange located at each portion, and slidably engaging the compression rod to said elongated tube with the first portion of the compression rod sliding inside said elongated tube;

c. positioning at least two rebound elastomers between said at least one flange located at said first portion of said compression rod and said second end of said elongated tube, and positioning at least one compression elastomer between said at least one flange located at said second portion of said compression rod and said second end of said tube, to set up said fork to said standard travel configuration; and d. removing at least one of said at least two rebound elastomers and adding at least one additional compression elastomer to convert said fork to said long travel configuration.

23. A method for converting a bicycle fork between a long travel configuration and a standard travel configuration, comprising the steps of:

a. providing an elongated tube which has a first end and a second end;

b. providing a compression rod which has a first portion, a second portion, and at least one flange located at each portion, and slidably engaging the compression rod to said elongated tube with the first portion of the compression rod sliding inside said elongated tube;

c. positioning at least one rebound elastomer between said at least one flange located at said first portion of said compression rod and said second end of said elongated tube, and positioning at least two compression elastomers between said at least one flange located at said second portion of said compression rod and said second end of said tube, to set up said fork to said long travel configuration; and d. removing at least one of said at least two compression elastomers and adding at least one additional rebound elastomer to convert said fork to said standard travel configuration.

24. A method for converting a bicycle fork between a standard travel configuration and a long travel configuration, comprising the steps of:

a. slidably engaging an elongated tube with a compression rod;

b. positioning a resilient compression assembly between said elongated tube and said compression rod to provide a compressive damping force when said fork leg is compressed from a balanced condition;

c. positioning a resilient rebound assembly between said elongated tube and said compression rod to provide a rebound damping force when said fork leg is extended from said balanced condition; and d. modifying said resilient compression and rebound assemblies correspondingly to convert said fork between said standard and long travel configurations.

25. A bicycle fork for interconnecting a bicycle wheel to a bicycle frame, said bicycle fork comprising:

at least one leg assembly comprising first and second leg members slidably engaged with each other, said at least one leg assembly being compressible by relative movement of said first and second leg members toward each other, and being expandable by relative movement of said first and second leg members away from each other, said leg assembly having a static length;

a compression biasing means for providing a biasing force when said at least one leg assembly compresses;

a rebound biasing means for providing a biasing force when said at least one leg assembly expands, said rebound biasing means including at least two separable segments, at least one of which is removable from the fork to allow for an increase in said static length of said leg assembly.

26. A bicycle fork, as recited in claim 25, wherein said compression biasing means comprise at least one compression elastomer and said rebound biasing means comprises at least two rebound elastomers.

27. A bicycle fork, as recited in claim 26, wherein said compression elastomer includes a bore extending therethrough, and wherein said bicycle fork further comprises an elastomer rod positioned through said bore in said compression elastomer.

28. A bicycle fork, as recited in claim 27, further comprising a compression rod having a first end interconnected with one of said leg members and a second end engaged with said compression biasing means, said compression rod having an aperture therein for slidably receiving said elastomer rod.

29. A bicycle fork, as recited in claim 28, wherein said elastomer rod extends at least one inch into said aperture when no external load is applied to said leg members.

30. A bicycle fork, as recited in claim 25, further comprising a compression rod having a first end interconnected with one of said leg members and a second end engaged with said compression biasing means.

31. A bicycle fork, as recited in claim 30, wherein said compression rod includes a compression flange positioned on said second end for engaging said compression biasing means.

32. A bicycle fork, as recited in claim 31, wherein said compression rod further includes a rebound flange for engaging said rebound biasing means.

33. A bicycle fork, as recited in claim 32, wherein said rebound biasing means is positioned around said compression rod.

34. A method for converting a bicycle fork between a standard travel configuration and a long travel configuration, said method comprising the steps of:

providing a bicycle fork comprising a leg assembly having first and second leg members slidably engaged with each other, a compression biasing means for providing a biasing force when the leg assembly compresses, and a rebound biasing means for providing a biasing force when the leg assembly expands;

shortening the effective length of the rebound biasing means; and lengthening the effective length of the compression biasing means to thereby increase the length of said bicycle fork from a standard travel configuration to a long travel configuration.

35. A method for converting a bicycle fork, as recited in claim 34, wherein said step of shortening comprises removing at least a portion of the rebound biasing means.

36. A method for converting a bicycle fork, as recited in claim 35, wherein the rebound biasing means comprises at least two spring elements, and wherein said step of removing at least a portion of the rebound biasing means comprises removing at least one of the spring elements.

37. A method for converting a bicycle fork, as recited in claim 34, wherein said step of lengthening comprises adding a spacer segment to the compression biasing means.

38. A method for converting a bicycle fork, as recited in claim 37, wherein the spacer segment comprises a spring segment.

39. A method for converting a bicycle fork, as recited in claim 34, wherein the compression biasing means comprises a compression elastomer, and wherein the rebound biasing means comprises a rebound elastomer.

* * * * *